United States Patent [19]
Schindler

[11] Patent Number: 6,092,125
[45] Date of Patent: Jul. 18, 2000

[54] METHOD AND APPARATUS FOR TRANSFERRING DATA FROM DEVICES NOT SUPPORTING BURST DATA TRANSFERS IN BURST MODE

[75] Inventor: Frederick R. Schindler, Sunnyvale, Calif.

[73] Assignee: Sun Microsystems, Inc., Palo Alto, Calif.

[21] Appl. No.: 09/121,025

[22] Filed: Jul. 22, 1998

[51] Int. Cl.$^7$ ..................................................... G06F 13/28
[52] U.S. Cl. ............................................. 710/35; 710/129
[58] Field of Search .................................. 710/104–106, 710/126–129, 33–35; 711/217–218

[56] References Cited

U.S. PATENT DOCUMENTS

| | | | |
|---|---|---|---|
| 5,276,684 | 1/1994 | Pearson | 370/438 |
| 5,732,406 | 3/1998 | Bassett et al. | 711/104 |
| 5,897,667 | 4/1999 | Miller et al. | 711/218 |

OTHER PUBLICATIONS

Author Unknown. "PCI Local Bus Specification Revision 2.1s" PCI Special Interest Group pp. ii–xvi, pp. 1–282 (Jun. 1, 1995).

*Primary Examiner*—Ayaz R. Sheikh
*Assistant Examiner*—Sumati Lefkowitz
*Attorney, Agent, or Firm*—Sierra Patent Group

[57] ABSTRACT

A method and apparatus for transferring data between devices on a bus is described, the apparatus comprising a producer device having an output, and a first data management device having an input and a bus interface. An the output of the producer device is coupled to an input of the data management device. An output of the data management device is coupled to the bus. The preferred method of the present invention includes the steps of causing the data management device to receive data packets from the producer device in single address-data phases, grouping at least two data packets destined for consecutive memory addresses, reorganizing the data within the first-in, first-out memory so that the at least two data packets destined for consecutive memory addresses are consecutive in the first-in, first-out memory, and transferring the data group over the bus using a single arbitration phase, a single address phase,. and a number of data phases corresponding to the number of data phases in said group. The present invention allows data from devices which do not support burst data transfers to be transferred in bursts.

12 Claims, 6 Drawing Sheets

METHOD AND APPARATUS FOR TRANSFERRING DATA FROM DEVICES NOT SUPPORTING BURST DATA TRANSFERS IN BURST MODE

BACKGROUND OF THE INVENTION

1. Field of the Invention

The present invention relates to a method and apparatus for handling bus data transfers. More particularly, the invention relates to a method and apparatus for combining multiple individual data segments destined for certain types memory addresses into a group which is then transferred over a bus using a single arbitration phase.

2. The Background Art

Computers of all types typically comprise a motherboard and two or more circuit cards connected together through one or more sets of common lines called buses. Common types of bus arrangements include Peripheral Component Interconnect (PCI)., Industry Standard Architecture (ISA), VESA Local Bus (VLB) and Small Computer Systems Interface (SCSI).

Figure 1:
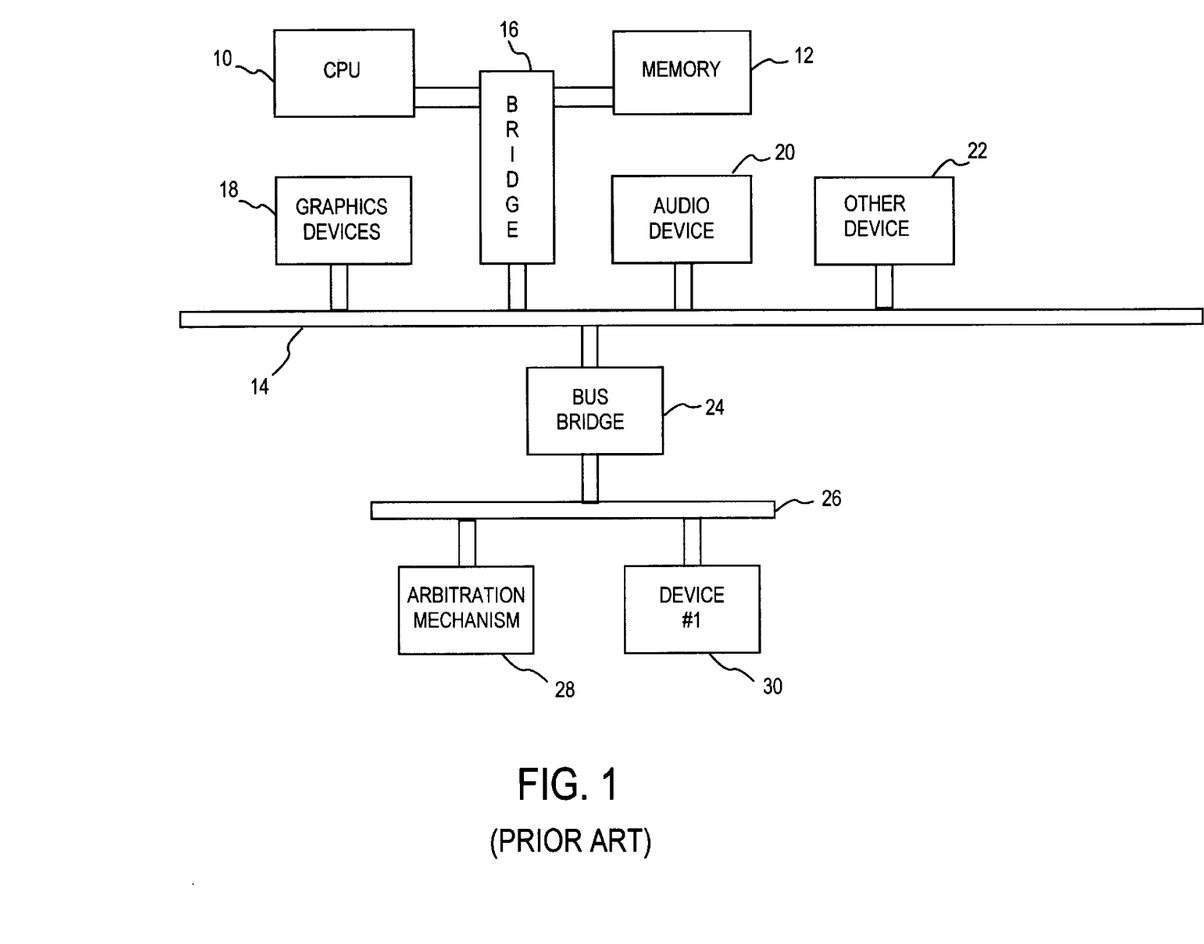
FIG. 1 depicts a prior art arrangement of computer devices which communicate using one or more buses.

FIG. 1 depicts a prior art arrangement of computer devices which communicate using one or more buses.

Referring to FIG. 1, CPU 10 interfaces with memory 12 and bus 14 through bridge 16. Also coupled to bus 14 are graphics device 18, audio device 20, other device 22, and bus bridge 24. Bus bridge 24 is coupled to a second bus 26 which may itself couple to several other devices such as bus master 28 and device 30.

Bus 14 and bus 26 each separately comprise a common set of interconnect lines which connect their coupled devices to each other so those devices may communicate with each other. Persons of ordinary skill in the art readily recognize that devices coupled to bus 14 may only communicate with devices coupled to bus 26 through bus bridge 24. If two or more of devices on either bus attempt to simultaneously transfer data over the bus, a data collision results, and neither set of data being transferred arrives intact at its destination. Thus, coupled to each bus is an arbitrator which determines which device has access to the bus at any given time.

For the purposes of this disclosure, bus 14 represents a PCI bus, and arbitration on bus 14 is provided by circuitry within bridge 16. Bus 26 is a second bus, and arbitration mechanism 28 may provide arbitration services for devices coupled to bus 26.

A producer device is defined for this disclosure to be a device having data to be transferred over a bus. Correspondingly, a consumer device shall be a device that recieves data over a bus or which is the destmation for a pending bus data transfer.

When a producer device on either bus 14 or bus 26 requires access to the bus for a data transfer, the producer device signals the requirement for bus access to the proper arbitrator. The arbitrator then acts on the request either by granting access to the bus, or by queuing the request so it will be acted on according to a fairness algorithm. Details of how this arbitration actually takes place over a PCI compliant bus may be found in PCI Specification Rev. 2.1 (hereafter called "PCI specification") available from the PCI Special Interest Group, Hillsboro, Oreg.

Computer designs which are compliant with the PCI specification have a PCI bus which allows devices to send data over the bus using a burst transfer. A burst transfer is allowed when successive data packets to be transferred over the bus are addressed to consecutive memory addresses. A burst transfer, after a device is granted permission by the arbitrator to transfer data, consists of a single address phase, followed by multiple data phases.

Although many devices exist which are capable of burst transmission over a given bus, such as the PCI compliant bus discussed herein, many devices exist such as CPU 10, graphics device 18, audio device 20, other device 22, and bus bridge 24 which lack the capability to perform burst data transmissions. These devices are able to transfer data over the bus to other devices, but must have an address phase for each data segment needing to be transferred. In some cases, additional arbitration phases are also required.

Any unnecessary arbitration sequences and address phases which result from single address-data phases being required use valuable time which would be better used for other operations. In a burst transmission, only one arbitration phase is typically required, since successive data phases transfer data to consecutive memory addresses. It would therefore be beneficial to provide a method and apparatus which collects data from devices which are not burst-capable, organizes the data destined for consecutive and increasing memory addresses so that the data may be efficently transferred, and then transferring that data across the bus using burst transmission.

Since a burst transmission allows for higher data throughput, data awaiting transmission while stored in a memory such as a first-in, first-out (FIFO) memory remains stored for less time than if single address-data phases were required. Thus, the cost and physical size of the apparatus may be minimized due to less storage location being required when burst transmissions are employed.

BRIEF DESCRIPTION OF THE INVENTION

A method and apparatus for transferring data between devices on a bus is described, the apparatus comprising a producer device having an output, and a first data management device having an input and an output, and a bus interface. The output of the producer device is coupled to the input to the data management device which organizes and processes the data, and the output of that data management device is then coupled to the bus through the bus interface.

A presently preferred method of the present invention includes the steps of causing the data management device to receive data packets from the producer device in single address-data phases, grouping at least two data packets destined for consecutive and increasing memory addresses, and transferring the data group over the bus using a single arbitration phase, a single address phase, and a number of data phases corresponding to the number of data packets in the group.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

The present invention couples a data management device (DMD) between the output of a producer device and a bus. The DMD collects data output from the producer device and analyzes the address information sent with or immediately prior to the data packet to determine whether two or more data segments which are awaiting transmission to the bus may be combined together so that they may be sent over the bus in a burst data transmission. The data stored in memory is then reorganized to ensure that burst transfer data segments are continuous in memory.

For the purposes of this disclosure, identical reference designations in different figures are intended to refer to substantially similar devices. Reference designations 32a through 32d are intended to each refer to a later described device 32 (see FIG. 3) having substantially similar characteristics, but modified to accomodate particular characteristics of the attached device.

Figure 2:
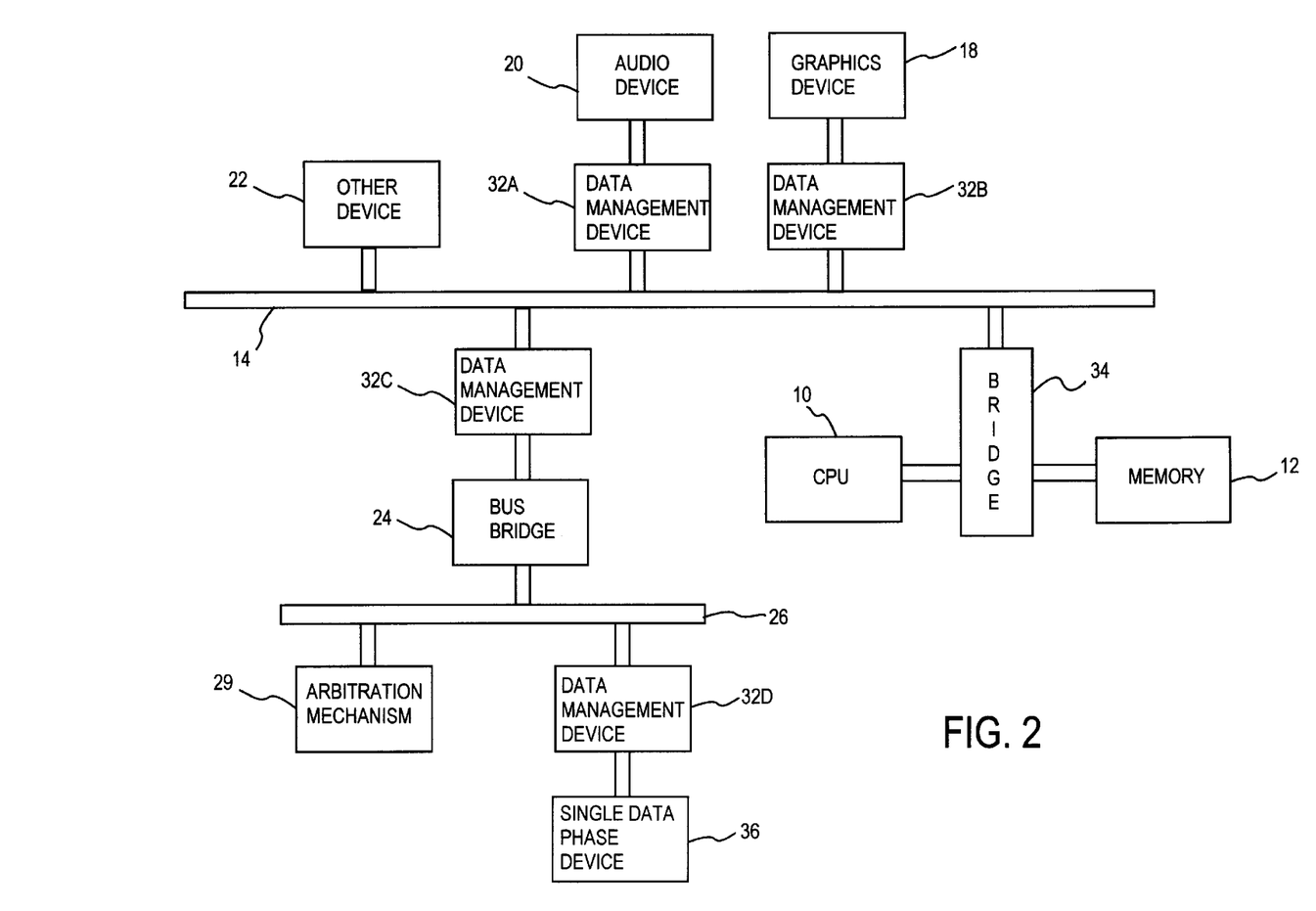
FIG. 2 is a data processing system incorporating a presently preferred embodiment of the present invention.

FIG. 2 is a data processing system incorporating a presently preferred embodiment of the present invention.

Referring to FIG. 2, the data processing system of FIG. 1 has been modified to include data management device 32 between non-burst capable producer devices, and the bus with which they are associated. Further, bridge 16 of FIG. 1 has been replaced by bridge 34 of FIG. 2 to show that the new data management device of the present invention may incorporated into bridge 16 to manage data transfers between CPU 10, memory 12 and bus 14.

Figure 3:
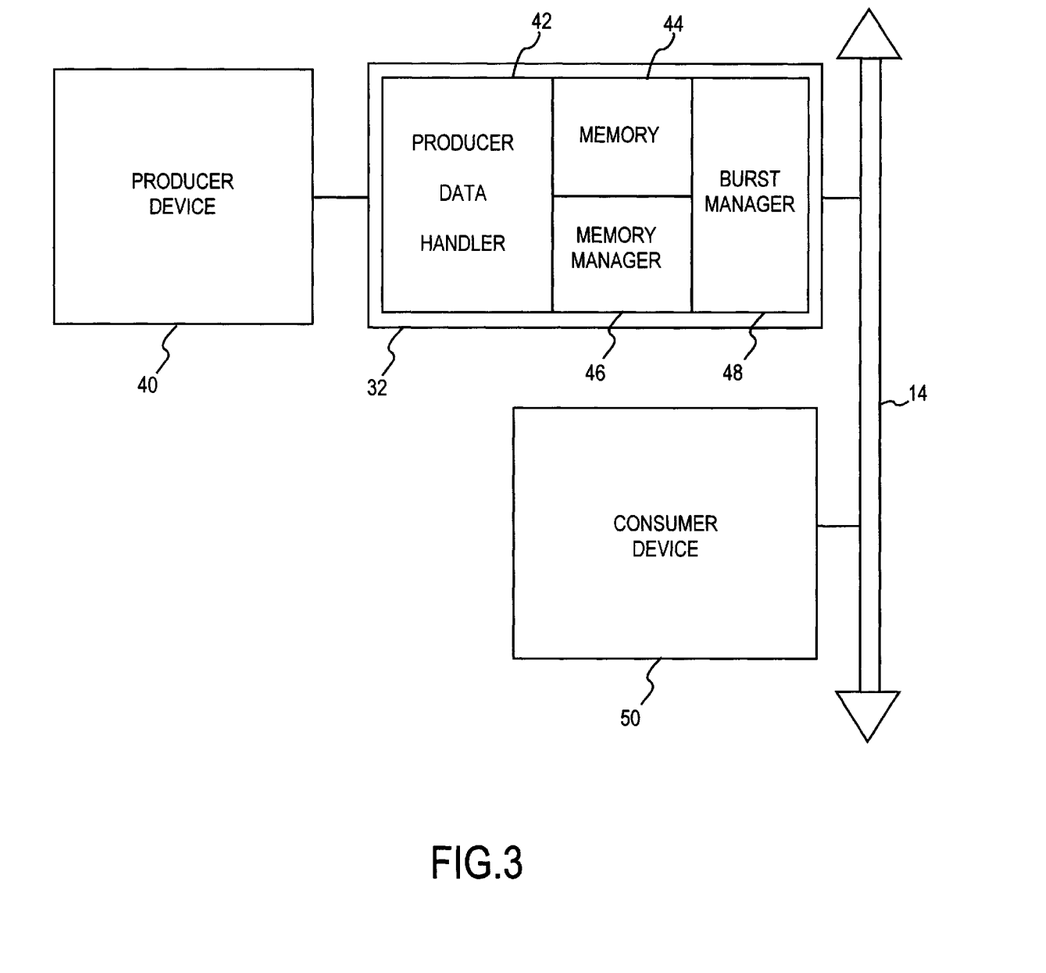
FIG. 3 is a block diagram of a presently preferred embodiment of the present invention.

FIG. 3 is a block diagram of a presently preferred embodiment of the present invention.

Referring to FIG. 3, producer device 40 is shown coupled to bus 14 through data management device 32. Data management device 32 comprises producer data handler 42, memory 44, memory manager 46, and burst manager 48. Producer data handler 42 handles data transmission between producer device 40 and memory 54, For producer devices 40 that are already PCI compliant but lack the capability to perform burst transfers, producer data manager 42 handles a data transfer with producer device 40 using standard PCI bus protocols, and passes the data to memory manager 46 which then stores the data in memory 44. Memory manager 46 handles data transfers into and out of memory 44. Burst manager 48 is a PCI compliant device which is capable of and handles arbitrating for bus usage and burst data transfers to consumer devices such as consumer device 50.

People of ordinary skill in the art will readily recognize that data management device 32 may be constructed from a programmable logic device, application-specific integrated circuits, or discrete logic, at the discretion of a designer familiar with this specification.

Figure 4A:
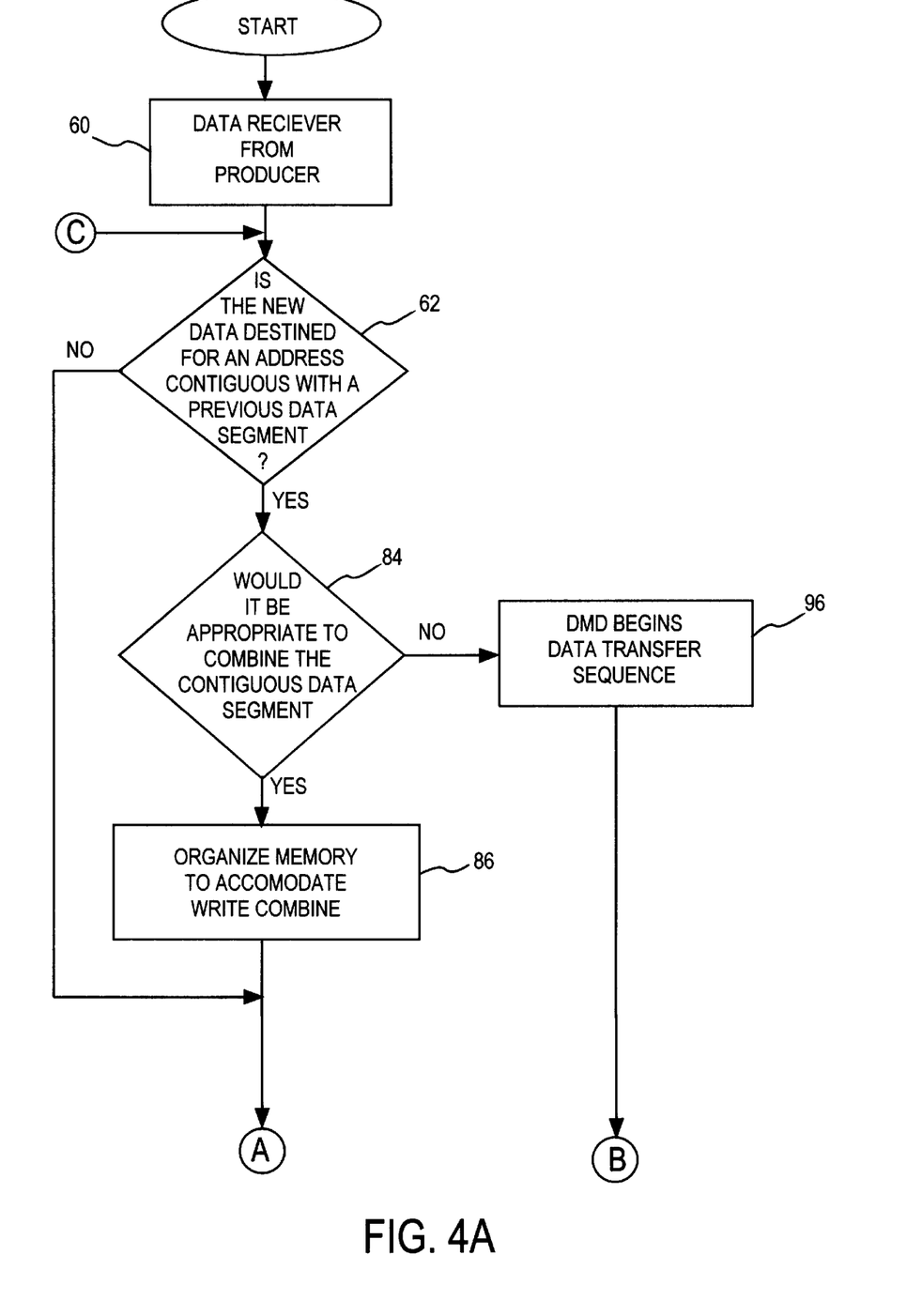
FIGS. 4A and 4B comprise a flow chart showing steps in a preferred method of the present invention.
Figure 4B:
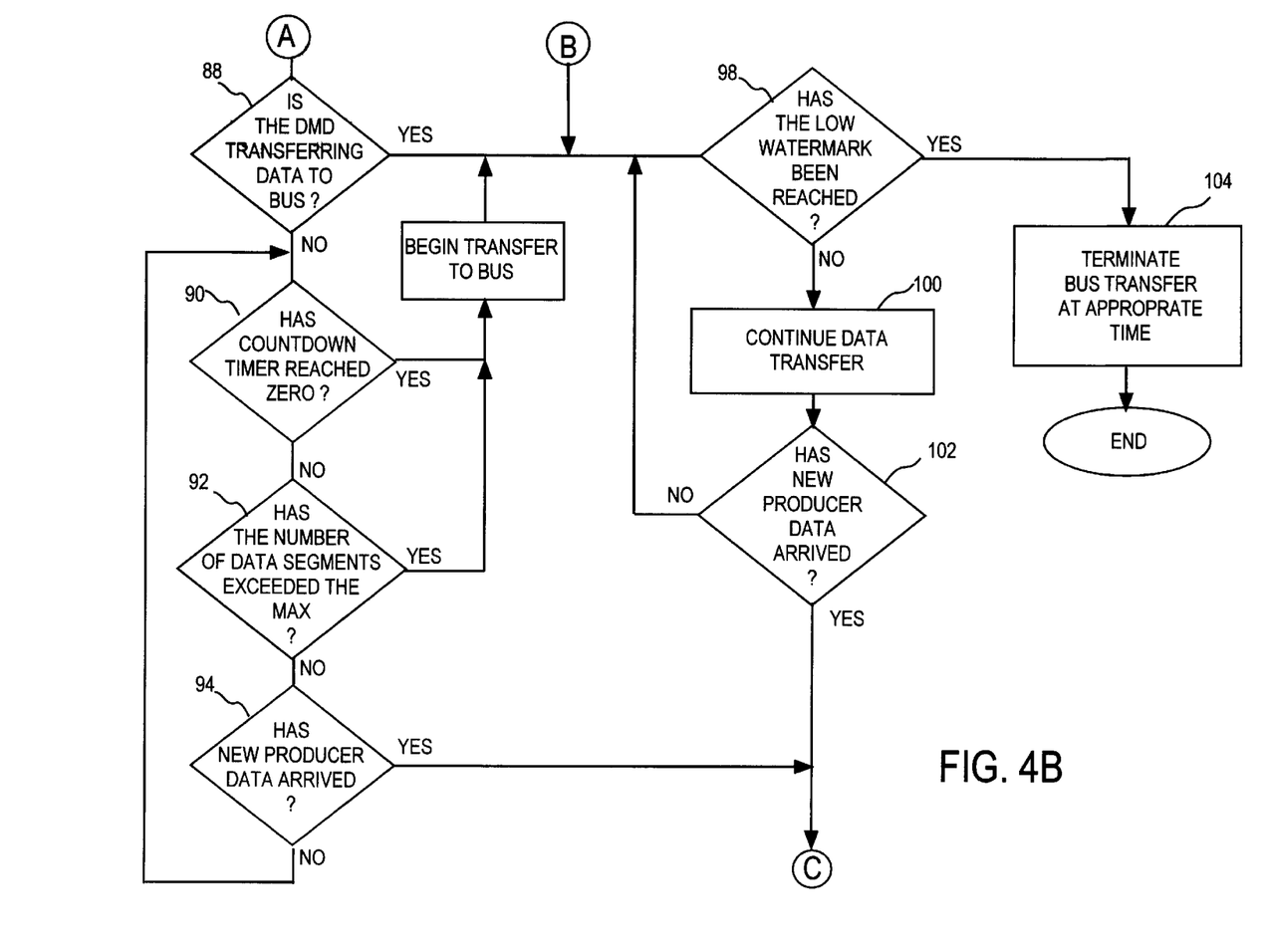

FIGS. 4A and 4B comprise a flow chart showing steps in a preferred method of the present invention.

Referring to FIG. 4A, the preferred method begins at step 60 when data is received by producer data handler 42 (shown at FIG. 3). When the first data segment is received, a countdown timer is started in order to ensure all data transfers are made within a reasonable time period. This timer will force a data transfer sequence to begin once the timer counts down to zero.

At step 62, the address of the received data is compared to data previously stored in memory 44 to determine whether the data received at step 60 is destined for an address which is contiguous with that previously stored data. In order to properly understand this step, an example will be provided. Contiguous means here that data is either immediately adjacent, or is near in time. Thus a data stream having 4-byte DWORDS, could have data at DWORD addresses 0, 4, and 12, with the DWORD at address 8 missing one, two, three, or all four bytes of data. In this instance, the DWORD for address 12 is contiguous, i.e. near in time, with the DWORD destined for address 4, and the DWORD at address 8 is filled with four bytes of empty data, and the respective byte enable flags are disabled.

Figure 5:
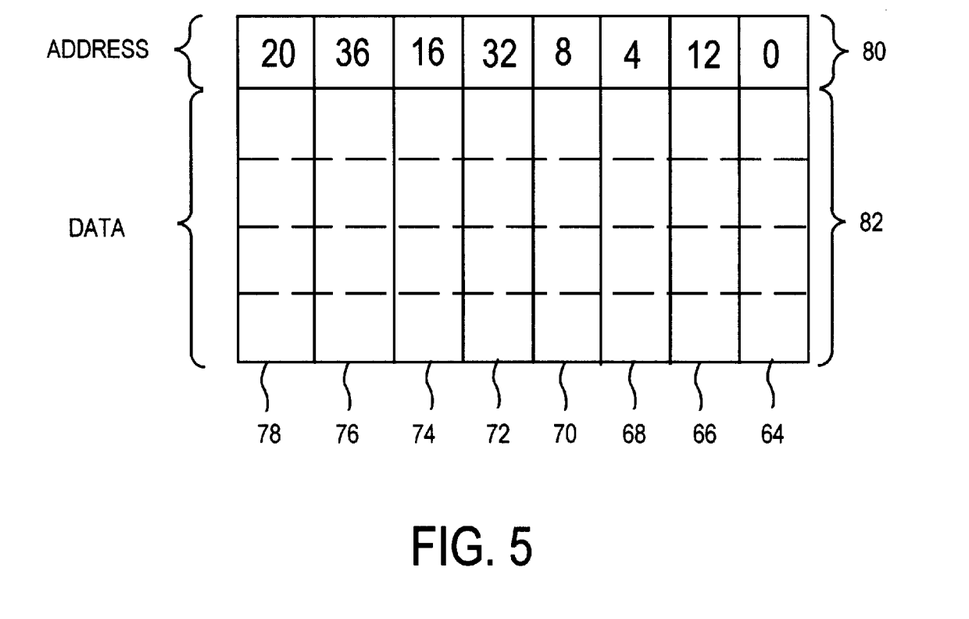
FIG. 5 is a diagram showing representative address-data combinations in memory.

FIG. 5 is a diagram showing address/data combinations which have been recieved by data management device 32 of FIG. 2 and subsequently stored in memory.

Referring to FIG. 5, address-data combinations 64, 66, 68, 70, 72, 74, 76, and 78 each have address segments 80 and data segments 82. Data segments 82 each comprise bytes of data to be transferred to a consumer device. Although eight address-data combinations are shown in FIG. 5, the actual number of combinations in memory at any given time will vary depending upon the particular device and the system being examined.

In a presently preferred embodiment, each data segment comprises 4 bytes of data, but persons of ordinary skill in the art will readily recognize that any number of bytes may be used in each data segment. Persons of ordinary skill in the art are also aware that a data segment which normally contains, for example, four bytes of data, may instead contain less than four bytes of data with the missing bytes having the associated "byte enable" flag disabled instead of containing valid data.

Data segment 64, in the example of FIG. 5, is destined for address 0. When data segment 64 arrived, memory 44 (FIG. 3) was empty, and thus there was no previous data segment in memory having an address that was consecutive with it. When data segment 66 arrives in memory 44, it is destined for memory address 12 which is not consecutive with any previous data segments. However, when data segment 68 arrives, step 62 of FIG. 4A would determine that data segment 68 is destined for a memory address consecutive with the memory address associated with data segment 64, since data segment 66 comprises four bytes of data destined for addresses 0, 1, 2, and 3, and data segment 68 comprises data destined for addresses 4, 5, 6, and 7.

Figure 6:
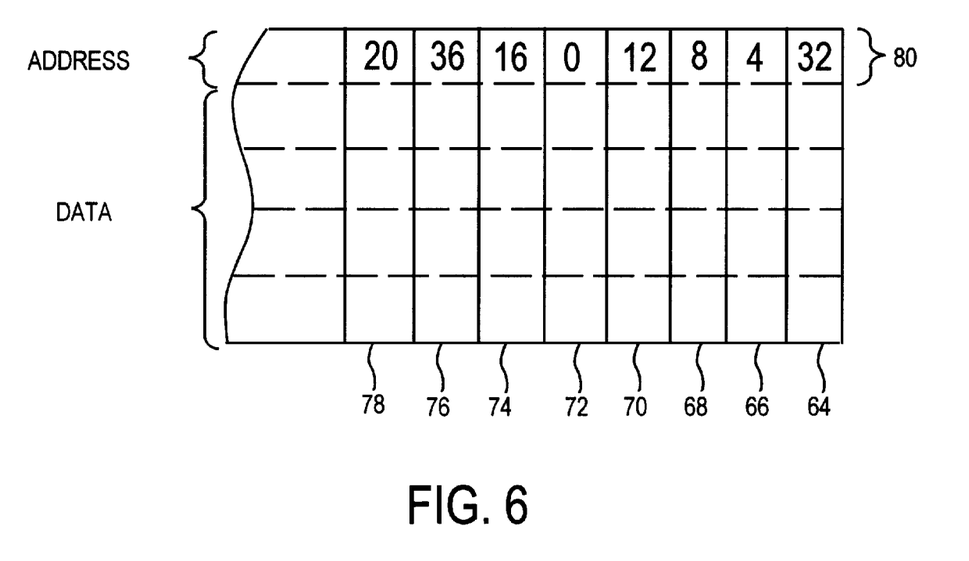
FIG. 6 is a diagram showing an alternative arrangement of address/data combinations which have been recieved by data management device 32.

FIG. 6 is a diagram showing an alternative arrangement of address/data combinations which have been recieved by data management device 32.

Referring to FIG. 6, bytes of data destined for certain addresses have been received in the order 32, 4, 8, 12, 0, etc. In a system capable of employing the cacheline wrap addressing mode known to those of ordinary skill in the art, the bytes addressed to addresses 4, 8, 12, and 0 (in that order) may be sent with no reordering. The term "consequtive" as used in this specification is intended to cover situtations where cacheline wrap addressing may be used, in addition to those situations where linear addressing is used.

The discussion of FIGS. 5 and 6 centered around two addressing modes of the PCI bus known to those of ordinary skill in the art as "linear" or "sequential", and "cacheline wrap". Those of ordinary skill in the art will readily recognize that other addressing modes are available for systems employing other bus arrangements. These other addressing modes may also be incorporated into the present invention, without departing from the scope or purpose of the present invention.

Referring again to FIG. 4A, if the result of step 62 was that the new data received is destined for an address that is contiguous with a data segment preceding it in memory, the method proceeds with step 84 when it is determined whether it would be appropriate to combine the two data segments for a burst transmission. For some data destined for some consumer devices, it may be disastrous to reorganize data in memory 50 in order to be able to burst multiple data segments over the bus. In the case of data segments 64 and 68 of FIG. 5, the two data segments are destined for consecutive addresses in memory. However, it may or may not be appropriate to reorganize the data in memory 50, depending on what data segment 66 contains, and what function, if any, it performs at memory addresses 12 through 15.

In the case of determining whether data segments 68 and 70 may be sent over the bus as one burst, it is most likely that the reason those data segments weren't sent as a burst originally was because the producer device 40 that provided the data was not capable of burst data transmission.

At step 84, if it is determined that it is appropriate to combine two data segments that are destined for consecutive memory addresses, the method proceeds with step 86 when the data in memory 44 is reorganized to ensure that the data segments that are to be combined into a burst are consecutive in memory 44.

The method then proceeds with step 88 where it is determined whether data management device 32 has been given bus access and is currently transferring data to the bus.

If data management device 32 is not currently transferring data to the bus, the preferred method of the present invention proceeds with step 90 where it is determined whether the countdown timer initialized at step 60 has counted down to zero.

If not, the method proceeds with step 92 where it is determined whether the number of data segments exceeds a preset maximum. The preset maximum is determined by a system designer and ensures that enough room remains in memory at the time the preset maximum is reached so that the producer device cannot fill up memory even if data is produced at the maximum rate attainable by that producer device. If memory 44 were to become full, producer device 40 would be required to hold data locally, or would be forced to stop producing data until some or all of the data in memory 44 had been transferred, conditions which are to be avoided, if possible.

If, at step 92 it is determined that the number of data segments in memory 44 has not exceeded a preset maximum, the method of the present invention proceeds with step 94 where it is determined whether new producer data has been received by producer data handler 42. If no, the method repeats steps 90, 92 and 94 until there exists an affirmative answer to any of the inquiries at either of these three steps.

If, at step 62, the new data which has arrived is not destined for an address which is consecutive with a data segment already in memory, the method of the present invention proceeds with step 88.

If, at step 84, it is not appropriate to combine the data segments (such as was the case with data segments 64 and 68 seen earlier), the method of the present invention proceeds with step 96 at which time the arbitration sequence to transfer data from memory 44 over the bus is started, and the transfer takes place, if bus access is granted.

The method then proceeds with step 98 where it is determined whether the number of data items currently in memory equals a preset minimum set by the system designer. If not, the data transfer continues at step 100. At step 102, it is determined whether new producer data has arrived at producer data handler 42. If no new data has arrived, the method proceeds again with step 98.

If, at step 98, it was determined that the number of data items currently in memory equals the preset minimum set by the system designer, the transfer of data over bus 14 is terminated as soon as appropriate.

If, at step 90 it was determined that the countdown timer reached zero, a data transfer sequence is started, including arbitration and setting up for a burst transmission if appropriate.

If at step 92 the number of data segments in memory 44 had exceeded a preset maximum, a bus data transfer sequence is started, including arbitration and setting up for a burst transmission if appropriate.

If, at either of step 94 or step 102, new producer data has arrived at producer data handler 42, the method proceeds again with step 62.

Although a PCI compliant bus was used as an example of a preferred use for the present invention, it is not necessary that a PCI-compliant bus be used when practicing the present invention. Rather, the present invention may be practiced with any bus that allows burst transfers, and which has devices coupled with the bus that are capable only of single address-data phase transfers.

When utilizing the present invention with a PCI bus arrangement, the criteria for selecting data for possible burst transmission includes determining whether the two or more data segmants being considered are destined for consecutive memory addresses. However, those of ordinary skill in the art will readily recognize that other buses may have different criteria for burst transmissions.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

We claim:

1. A method for transferring data from a producer device through a data management device and output over a bus, the data management having a first-in, first-out memory, the method comprising:

causing the producer device to send at least two data packets from said producer device to the data management device, the transfer of each data packet each using a single address phase and a single data phase;

determining whether said at least two data packets received from said producer device by said data management device are destined for consecutive memory addresses;

storing said at least two data packets transferred from said producer device in the first-in, first-out memory;

determining, if said at least two data packets received from said producer device are destined for two consecutive memory addresses, whether said at least two data packets destined for two consecutive memory addresses are consecutive in said first-in, first-out memory;

reorganizing the data within said first-in, first-out memory so that the at least two data packets destined for consecutive memory addresses are consecutive in said first-in, first-out memory; and causing, if at least two data packets received from the producer device are destined for consecutive memory addresses, the data management device to transfer said at least two data packets destined for consecutive memory addresses over the bus using a single arbitration phase, a single address phase, and a number of data phase equal to the number of data packets being transferred.

2. A data processing apparatus comprising:

a producer device having an output;

a first-in, first-out memory device;

a data management device having an input and a bus interface, said data management device coupled to said first-in, first-out memory device, said input of said data management device coupled to said output of said producer device; and said producer device being capable of receiving data packets from said producer device in single address-data phases, grouping at least two data packets destined for consecutive memory addresses, reorganizing said data packets within said first-in, first-out memory so that said at least two data packets destined for consecutive memory addresses are consecutive in said first-in, first-out memory, and retransmitting said group over the bus interface using a single arbitration, a single phase, and a number of data phases corresponding to the number of data phases within said group.

3. The data processing apparatus of claim 2 further including:

a consumer device having an input and a bus interface, wherein said consumer device is coupled to a bus through said bus interface, said consumer device being capable of receiving multiple data packets over said bus which are destined for consecutive memory addresses, said data packets being received using a single bus phase, a single address phases, and multiple data phases.

4. The data processing apparatus of claim 2, wherein said producer device is further defined as an audio device.

5. The data processing apparatus of claim 2, wherein said producer device is further defined as a video device.

6. The data processing apparatus of claim 2, wherein said producer device is further defined as a central processing unit.

7. The data processing apparatus of claim 2, wherein said producer device is further defined as a bus bridge.

8. The data processing apparatus of claim 2 further including a bus coupled to said bus interface of said data management device.

9. The data processing apparatus of claim 8, wherein said bus is a PCI bus.

10. The data processing apparatus of claim 8, wherein said bus is a ISA bus.

11. The data processing apparatus of claim 8, wherein said bus is a SCSI bus.

12. A data processing apparatus comprising:

means for a producer device, said producer device having an output;

means for a first-in, first-out memory device;

means for a data management device having an input and a bus interface, said data management device coupled to said first-in, first-out memory device, said input of said data management device coupled to said output of said producer device; and means for said producer device being capable of receiving data packets from said producer device in single address-data phases, grouping at least two data packets destined for consecutive memory addresses, reorganizing said data packets within said first-in, first-out memory so that said at least two data packets destined for consecutive memory addresses are consecutive in said first-in, first-out memory, and retransmitting said group over the bus interface using a single arbitration, a single phase, and a number of data phases corresponding to the number of data phases within said group.

* * * * *